United States Patent [19]
Hughes

[11] Patent Number: 5,738,194
[45] Date of Patent: Apr. 14, 1998

[54] SYNCHRONIZER

[75] Inventor: Douglas A. Hughes, Wixom, Mich.

[73] Assignee: Eaton Corporation, Cleveland, Ohio

[21] Appl. No.: 717,008

[22] Filed: Sep. 20, 1996

[51] Int. Cl.$^6$ ...................................................... F16D 47/00
[52] U.S. Cl. .......................... 192/48.4; 192/53.34; 74/339
[58] Field of Search ................................. 192/48.4, 48.5, 192/48.91, 48.3, 53.34, 53.32; 74/339

[56] References Cited

U.S. PATENT DOCUMENTS

| | | |
|---|---|---|
| 5,135,087 | 8/1992 | Frost. |
| 5,560,461 | 10/1996 | Loeffler .............................. 192/53.34 X |
| 5,588,516 | 12/1996 | Braun et al. ........................... 192/48.91 |

FOREIGN PATENT DOCUMENTS 2214852  10/1973  Germany.

Primary Examiner—Rodney H. Bonck
Assistant Examiner—Saul J. Rodriguez
Attorney, Agent, or Firm—Paul S. Rulon; Howard D. Gordon

[57] ABSTRACT

A double acting, baulkring-type synchronizer (20) for frictionally synchronizing and positive connecting first and second gears (14, 16) to a shaft (12). The synchronizer includes a first cone clutch with friction members (22,46) for frictionally synchronizing gear (14) with shaft (12) and a second cone clutch with friction members (24,44) for frictionally synchronizing gear (16) with shaft (12). The synchronizer further includes a third cone clutch with friction members (18,56) which is engaged in response to engagement of the first cone clutch and axial movement of the first gear (14).

16 Claims, 1 Drawing Sheet

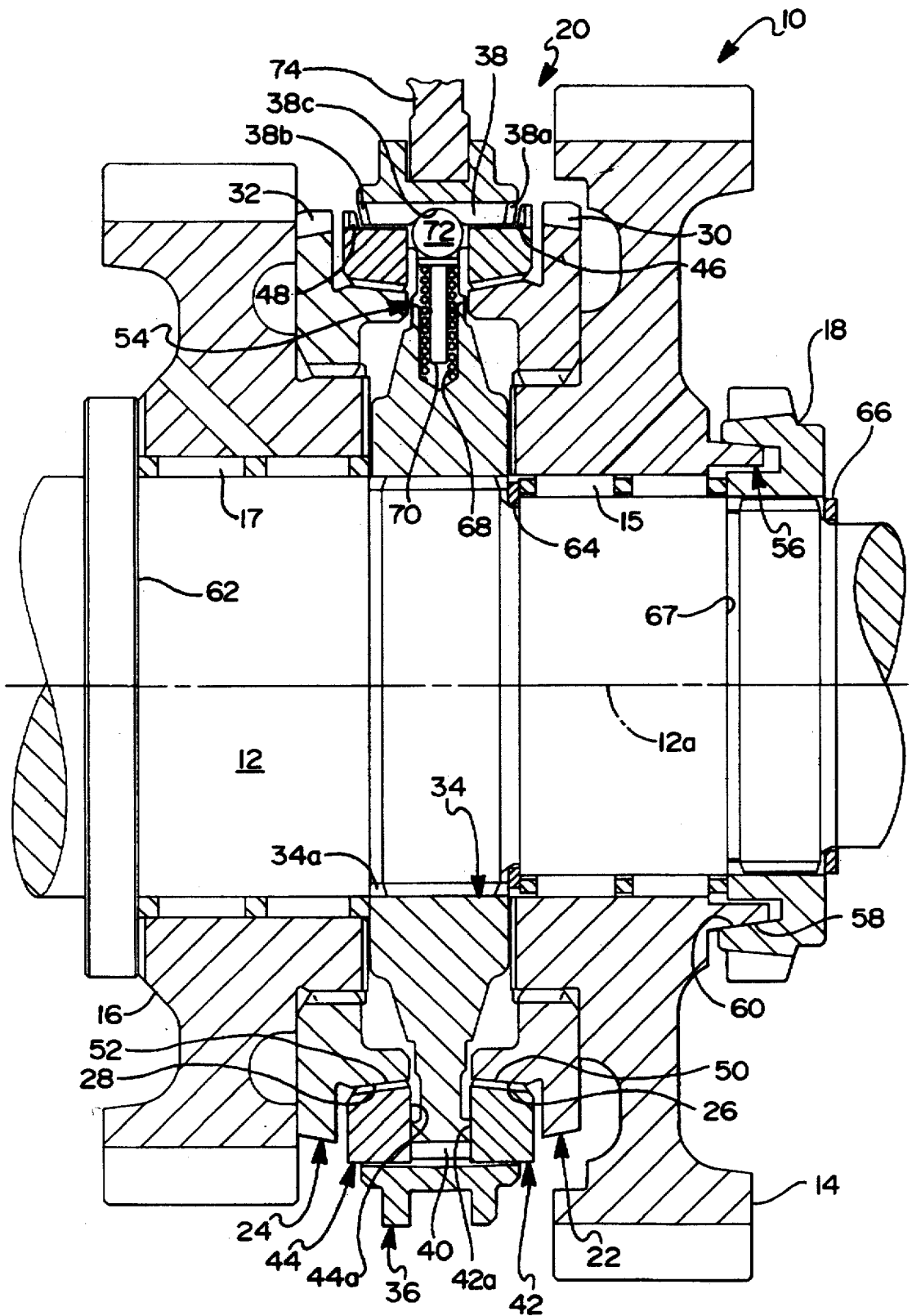

SYNCHRONIZER

FIELD OF THE INVENTION

This invention relates to a synchronizer for multi-ratio transmissions.

BACKGROUND OF THE INVENTION

Synchronizers for use in multi-ratio transmissions are well known. Such synchronizers generally include pairs of friction and jaw members for respectively synchronizing and positive clutching a gear to a shaft, pre-energizer assemblies for engaging the friction members in response to initial engaging movement of a shift sleeve or flange rotatable with the shaft, and blocker surfaces for arresting engaging movement of the shift sleeve or flange until synchronization is reached and for transferring full shift force from the sleeve or flange to increase the engaging force of the friction members.

It is also known in the multiple ratio transmission art that synchronizers may be used to reduce operator shift time and/or shift effort of all or some of the transmission gear ratios by providing the synchronizer with multiple cones. It is also known that the operator shift time and/or effort may be reduced by use of synchronizers of the self-energizing type and that such synchronizers may also incorporate multiple cones. Since operator shift effort generally increases with vehicle size and weight, synchronizers that reduce operator shift effort are especially important for trucks, particularly medium and heavy duty trucks. A synchronizer having multiple cones and self-energizing may be seen by reference to published German Patent disclosure 2,214,852 and U.S. Pat. No. 5,135,087, which are incorporated herein by reference. The synchronizers in both of these documents are of the so called baulkring-type. However, multiple cones may also be used with pin-type synchronizers such as disclosed in U.S. Pat. No. 5,092,439 which is incorporated herein by reference. The synchronizer disclosed herein includes multiple cones and may be used with self-energizing.

SUMMARY OF THE INVENTION

An object of this invention is to provide a multiple cone synchronizer with improved actuation of the second cone.

According to a feature of the invention, a synchronizer frictionally and positively connects first and second drives disposed for relative rotation about a common axis. The synchronizer comprises a first jaw member rotatable with the first drive and axially movable from a neutral position to an engaged position with a second jaw member for positive connecting the drives in response to engaging movement of the first jaw member by an axially directed first shift force. A first friction member is axially movable into engagement with second friction member in response to the engaging movement of the first jaw member for producing an initial synchronizing torque. Blocker surfaces are moved into engagement in response to the initial synchronizing torque for preventing asynchronous engagement of the jaw members, for transmitting the shift force to the first friction member, and for producing a torque counter to the synchronizing torque for moving the blocker surfaces out of engagement as synchronization is reached.

The improvement is characterized by an assembly mounting the second drive for rotation and axial movement relative to the second drive. A third friction member is affixed against axial and rotational movement relative to the first drive. A fourth friction member is affixed for rotation with the second drive and is axially moveable into engagement with the third friction member in response to axial movement of the second drive effected by engagement of the first and second friction members.

The improvement simplifies engagement of a second cone clutch for synchronizing a gear, facilitates use of a second cone clutch with standard or substantially standard synchronizers, facilitates use of a second cone clutch with only minor change to the transmission, and does not impair cooling of the cone clutches since they are axially spaced apart.

BRIEF DESCRIPTION OF THE DRAWING

The synchronizer of the invention is shown in the accompanying drawing in which FIG. 1 is an elevational sectional view of a double-acting synchronizer in a neutral position and having a second cone assembly associated with one side of the synchronizer.

DETAILED DESCRIPTION OF THE DRAWING

The term "synchronizer" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate synchronizer clutch mechanism which includes ramps or cams or the like to increase the engaging force of the synchronizing clutch in proportion to the synchronizing torque of the friction clutch.

Looking now at FIG. 1, therein is shown a portion of a multiple ratio transmission 10 including a partially shown first drive or shaft 12 mounted for rotation about a central axis 12a, axially spaced apart second and third drives or forward drive gears 14,16 supported on the shaft for rotation relative thereto, a member 18 affixed against rotation relative to the shaft by splines, and a double-acting synchronizer 20.

The synchronizer 20 includes annular members 22,24 axially and rotatably affixed to gears 14,16 in known manner and having cone friction surfaces 26,28 defining gear friction members herein integral with members 22,24, jaw teeth 30,32 defining gear jaw members herein integral with members 22,24, a hub member 34 axially and rotatably affixed at a central opening 34a thereof to shaft 12, a shift sleeve 36, internal spline teeth 38 defined on a central opening of sleeve 36 and in constant mesh with external spline teeth 40 defined on the outer circumference of hub 34, baulkring/friction members 42,44 defining blocker teeth surfaces 46,48 and friction surfaces 50,52, a pre-energizer assembly 54. The right-hand side of the synchronizer includes a second cone clutch defined by a friction member 56 having a friction surface 58 affixed to gear 14 and a friction member defined by member 18 and having a friction surface 60. Member 18 may be part of an unshown gear assembly of the transmission. Herein member 18 is a reverse drive gear assembly jaw clutch for connecting an unshown reverse gear to shaft 12 in response to axial movement of the unshown reverse gear in known manner.

Gear 16 and hub 34 are affixed against axial movement relative to each other and to shaft 12 via retainers 62,64. Member 18 is affixed against rightward and leftward axial movement along shaft 12 by a retainer 66 and a shoulder 67, respectively. Gears 14 and 16 are mounted for rotation relative to each other and shaft 12 by bearing assemblies 15 and 17. As is readily seen, friction surfaces 26,50 pair up to define friction clutches for synchronizing gear 14 to the shaft 12 prior to engagement of jaw clutch member 30 with a jaw clutch member defined by internal splines 38. Friction surfaces 28,52 pair up to define a friction clutch for synchronizing gear 16 to the shaft 12 prior to engagement of jaw clutch member 32 with a jaw clutch member defined by internal spline teeth 38. Cone clutches are preferred; however, other types of friction clutches may be used. A wide range of cone angles may be used. Cone angles of about seven degrees are employed herein. The friction surfaces may be defined by any of several known friction materials affixed to one or both friction members of each cone clutch. For example, the cone surfaces may be grooved steel with a molybdenum coating or a pyrolytic carbon friction material such as disclosed in U.S. Pat. No. 4,700,823; 4,844,218 and 4,778,548. These patents are incorporated herein by reference.

Opposite ends of shift sleeve spline teeth 38 include angled blocker surfaces 38a,38b which cooperate with mating angled blocker teeth surfaces 46,48 of baulkring 42,44 for preventing asynchronous engagement of the jaw members, for transmitting the shift force to the cone clutch, friction surfaces to effect an engagement force producing a synchronizing torque proportional to the shift force, and for producing a torque counter to the synchronizing torque for moving the blocker teeth out of engagement as synchronization is reached and thereby allowing spline teeth 38 defining the axially movable jaw members to engage teeth 30 or 32 of the gear jaw members.

Spline teeth 38 and 40 have axially extending flank surfaces which continuously mate in close sliding relation so that there is relatively no free play between shift sleeve 36 and shaft 12. Flank surfaces of splines 38 and of gear jaw teeth 30,32 may be provided with a back out or locking angle feature to prevent inadvertent disengagement of the teeth. Details of this feature may be seen by reference to U.S. Pat. No. 4,727,968 which is incorporated herein by reference.

Each pre-energizer assembly 54, which is known in the art, includes a helical compression spring 68 and plunger 70 disposed in a radially extending blind bore and biasing a roller or ball 72 (herein a roller) into an annular detent groove 38c in sleeve splines 38. Pre-energizer assembly 54 resiliently positions shift sleeve 36 in the neutral position shown in FIG. 1. Rollers 72 are axially spaced between abutment surfaces 42a,44a of tab portions formed integral with baulkrings 42,44 and loosely received in recesses in hub 34 in known manner. When it is desired to couple either gear to the shaft, an appropriate and unshown shift mechanism, such as disclosed in U.S. Pat. No. 4,920,815 and incorporated herein by reference, moves shift sleeve axially via partially shown shift fork 74 along the axis of shaft 12 either left to couple gear 16 or right to couple gear 14. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to shift sleeve 36 in an axial direction.

Initial rightward axial movement of shift sleeve 36 from the neutral position by the operator shift force is transmitted by pre-energizer rollers 72 to baulkring 42 via tab abutment surfaces 42a to effect initial frictional engagement of movable cone surface 50 with gear cone surface 26. The initial engagement force of the cone surface is, of course, a function of the force of spring 58 and the angles of the walls of detent grooves 38c. The initial engagement force moves gear 14 and friction member 56 rightward, thereby also engaging cone surfaces 58,60. The initial frictional engagement (provided an asynchronous condition exists) produces an initial cone clutch engaging force and synchronizing torque which in known manner ensures limited relative rotation between shift sleeve 36 and baulkring 42, and hence, movement of blocker teeth 46 to a position wherein the correct angled blocker surfaces of the blocker teeth engage the correct angled blocker surfaces of spline teeth 38. When the blocker surfaces are engaged, the full operator shift force on shift sleeve 36 is transmitted to friction surfaces 26,50 and 58,60 via angled blocker surfaces 38a,46, whereby the cone clutch is engaged by the full force of the operator shift force to provide full synchronizing torque. Since the blocker surfaces are disposed at angles relative to the axial direction of operator shift force, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker teeth move out of engagement to allow continued axial movement of the shift sleeve and engagement of movable jaw teeth 38 with gear jaw teeth 30.

Initial leftward axial movement of shift sleeve 36 from the neutral position effects frictional engagement of cone surfaces 28,52 and blocker surfaces 38b,48. The synchronizing torque for gear 16 is substantially less than for gear 14 because only one cone clutch is used. However, a second or more cone clutches may be provided for gear 16 in a manner analogous to that of gear 14.

A preferred embodiment of a synchronizer has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A synchronizer for frictionally and positively connecting first and second drives disposed for relative rotation about a common axis; the synchronizer comprises:

a first drive and a second drive, and a drive gear defining the second drive;

an assembly mounting the drive gear for rotation on the first drive about the common axis;

a first jaw member rotatable with the first drive and axially movable from a neutral position to an engaged position with a second jaw member for positive connecting the first drive and the drive gear in response to engaging movement of the first jaw member by an axially directed first shift force;

a first friction member axially movable into engagement with a second friction member in response to the engaging movement of the first jaw member for producing an initial synchronizing torque;

blocker surfaces moveable into engagement in response to the initial synchronizing torque for preventing asynchronous engagement of the jaw members, for transmitting the shift force to the first friction member, and for producing a torque counter to the synchronizing torque for moving the blocker surfaces out of engagement as synchronization is reached; characterized by:

the assembly allowing axial movement of the drive gear relative to the first drive;

a third friction member affixed against axial and rotational movement relative to the first drive; and a fourth friction member affixed for rotation with the drive gear and axially moveable into engagement with the third friction member in response to axial movement of the drive gear effected by engagement of the first and second friction members.

2. The synchronizer of claim 1, wherein:

the drive gear is axially interposed between first and second friction members and the third and fourth friction members.

3. The synchronizer of claim 1, wherein:

the synchronizer is disposed in a multiple ratio transmission; and the third friction member is affixed to a part of a drive gear assembly of the transmission and not otherwise associated with the synchronizer.

4. The synchronizer of claim 3, wherein:

the second drive gear is axially interposed between first and second friction members and the third and fourth friction members.

5. The synchronizer of claim 3, wherein:

the third friction member is affixed to a jaw clutch which is affixed to the part of the drive gear assembly and the drive gear is a forward drive gear.

6. The synchronizer of claim 5, wherein: the drive gear is axially interposed between first and second friction members and the third and fourth friction members.

7. The synchronizer of claim 5, wherein:

the jaw clutch of the drive gear assembly is a reverse drive gear jaw clutch.

8. The synchronizer of claim 7, wherein:

the drive gear is axially interposed between first and second friction members and the third and fourth friction members.

9. The synchronizer of claim 1, further including a third drive disposed for rotation about the common axis relative to the first drive and the drive gear and axially spaced from the drive gear, a third jaw member rotatable with the first drive and axially movable from a neutral position to an engaged position with a fourth jaw member for positive connecting the first and third drives in response to engaging movement of the third jaw member by a second shift force directed axially opposite the first mentioned shift force;

a fifth friction member axially movable into engagement with a sixth friction member in response to the engaging movement of the third jaw member for producing an initial synchronizing torque; and blocker surfaces moveable into engagement in response to the initial synchronizing torque for preventing asynchronous engagement of the third and fourth jaw members, for transmitting the shift force to the fifth friction member, and for producing a torque counter to the synchronizing torque for moving the blocker surfaces out of engagement as synchronization is reached.

10. The synchronizer of claim 9, wherein:

the drive gear is axially interposed between first and second friction members and the third and fourth friction members.

11. The synchronizer of claim 9, wherein:

the synchronizer is disposed in a multiple ratio transmission; and the third friction member is affixed to a part of a drive gear assembly of the transmission and not otherwise associated with the synchronizer.

12. The synchronizer of claim 11, wherein:

the drive gear is axially interposed between first and second friction members and the third and fourth friction members.

13. The synchronizer of claim 11, wherein:

the third friction member is affixed to a jaw clutch which is affixed to the part of the drive gear assembly and the drive gear is a forward drive gear.

14. The synchronizer of claim 13, wherein:

the drive gear is axially interposed between first and second friction members and the third and fourth friction members.

15. The synchronizer of claim 13, wherein:

the jaw clutch of the drive gear assembly is a reverse drive gear jaw clutch.

16. The synchronizer of claim 15, wherein:

the drive gear is axially interposed between first and second friction members and the third and fourth friction members.

* * * * *